3,320,246
DERIVATIVES OF ISONIPECOTAMIDE
John W. Cusic, Skokie, and Peter Yonan, Chicago, Ill., assignors to G. D. Searle & Co., Chicago, Ill., a corporation of Delaware
No Drawing. Filed Jan. 18, 1965, Ser. No. 426,375
6 Claims. (Cl. 260—243)

The present invention relates to a group of complex organic compounds which contain the isonipecotamide structure. More particularly, it relates to a group of compounds having the following general formula

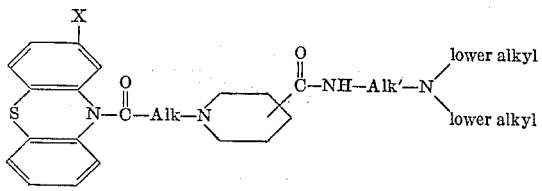

wherein X is selected from the group consisting of hydrogen, halogen, and lower alkanoyl; Alk and Alk' are both lower alkylene with the additional limitation that Alk' separates the nitrogen atoms attached thereto by at least 2 carbon atoms.

The halogen atoms referred to above include fluorine, chlorine, bromine, and iodine. The lower alkanoyl radicals referred to above contain up to 6 carbon atoms and can be exemplified by radicals such as acetyl, propionyl, and butyryl. The lower alkylene radicals referred to above also contain up to 6 carbon atoms and are exemplified by radicals such as methylene, ethylene, 1,2-propylene, and trimethylene. The lower alkyl radicals referred to in the formula above also have an upper limit of 6 carbon atoms and they are exemplified by radicals such as methyl, ethyl, propyl, isopropyl, and butyl.

The organic bases of this invention form nontoxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are useful because of their pharmacological properties. Thus, the compounds possess anti-ulcer activity; this is demonstrated by a decrease in acid secretion and inhibition of ulcer formation in the Shay rat. The compounds are also hypocholesterolemic agents—they inhibit hepatic synthesis of cholesterol. They also possess anti-inflammatory activity; this is demonstrated by a phenylbutazone-like effect on edematous conditions. Furthermore, the present compounds possess anti-biotic activity against a variety of organisms. Thus, they inhibit the growth of bacteria such as *Diplococcus pneumoniae*, fungi such as *Candida albicans*, algae such as *Chlorella vulgaris*, and protozoa such as *Tetrahymena gelleii*. These compounds also inhibit germination of seeds of Trifolium.

The compounds of the present invention are conveniently prepared by the reaction of a 10-(haloalkanoyl)phenothiazine with an appropriate N-substituted isonipecotamide. The reaction is carried out at reflux in an inert solvent such as methyl ethyl ketone in the presence of an inorganic base such as potassium carbonate. The base serves to react with the hydrogen chloride formed in the course of the reaction.

The following examples are presented to further illustrate the present invention; they should not be construed as limiting it in spirit or in scope. In these examples, quantities are indicated in parts by weight and temperatures in degrees centigrade (° C.).

*Example 1*

A mixture of 34 parts of N,N-dipropylethylenediamine, 60 parts of potassium carbonate, and 360 parts of 2-butanone is stirred and 53 parts of isonicotinoyl chloride hydrochloride is added portionwise (as the solid) over a period of 30 minutes. Some heat is generated in the process but the mixture is refluxed for 1 hour after the addition is complete. The mixture is then filtered and the solvent is evaporated from the filtrate under reduced pressure. The residue is dissolved in ether and the ether solution is washed with several portions of water before it is dried and treated with charcoal. Evaporation of the solvent leaves a residual oil which is distilled under reduced pressure to give N-(2-dipropylaminoethyl)isonicotinamide boiling at about 150° C. at 0.1 mm. pressure. This product solidifies on standing.

A solution of 33 parts of N-(2-dipropylaminoethyl)isonicotinamide in 120 parts of ethanol is mixed with 4 parts of 5% ruthenium on charcoal and hydrogenated at a hydrogen pressure of 1000 pounds per square inch. In the hydrogenation process, the mixture is heated at 103° C. with stirring for a period of 6 hours. The resultant mixture is then filtered to remove the catalyst and the solvent is evaporated from the filtrate to leave a residual oil which solidifies on standing. The product thus obtained is N-(2-dipropylaminoethyl)isonipecotamide.

*Example 2*

A solution is prepared from 9 parts of 10-(3-chloropropionyl)phenothiazine and 120 parts of 2-butanone, and 10 parts of potassium carbonate is added. The resultant mixture is heated to reflux and a solution of 7 parts of N-(2-diethylaminoethyl)isonipecotamide in 25 parts of 2-butanone is added portionwise. The mixture is then stirred and refluxed for 17 hours before it is filtered to remove the inorganic salts. The solvent is evaporated from the filtrate to leave a residual oil which is triturated with pentane to give solid product. This is recrystallized from a mixture of benzene and cyclohexane to give 10-{3 - [4 - (2 - diethylaminoethylcarbamoyl)piperidino]propionyl}phenothiazine melting at about 108–109° C. This compound has the following formula

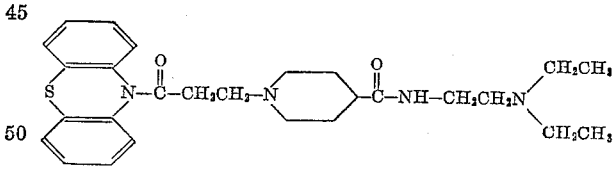

*Example 3*

The reaction of N-(2-dipropylaminoethyl)isonipecotamide with 10-(3-chloropropionyl)phenothiazine according to the procedure described in Example 2 gives 10-{3-[4-(2 - dipropylaminoethylcarbamoyl)piperidino]propionyl} phenothiazine melting at about 98–100° C. after recrystallization from cyclohexane.

Likewise, the reaction of N-(2-diethylaminoethyl)isonipecotamide with 10 - (3 - chlorobutyryl)phenothiazine gives 10{3-[4-(2-diethylaminoethylcarbamoyl)piperidino] butyryl}phenothiazine melting at about 88–89° C.

If N-(3-dimethylaminopropyl)isonipecotamide is reacted with 10-(3-chloropropionyl)phenothiazine in the same way, the product is 10-{3-[4-(3-dimethylaminopropylcarbamoyl)piperidino]propionyl}phenothiazine.

Similarly, 3-(2-diethylaminoethylcarbamoyl)piperidine reacts with 10-(3-chloropropionyl)phenothiazine to give 10 - {3 - [3 - (2-diethylaminoethylcarbamoyl)piperidino] propionyl}phenothiazine.

Example 4

A mixture of 62 parts of 2-chlorophenothiazine and 84 parts of chloroacetic anhydride is heated to 150° C. and 0.1 part of ferric chloride is added. The mixture is then heated at 150–160° C. for 1 hour, an additional 0.1 part of ferric chloride is added, and heating at 150–160° C. is resumed for an additional hour. The mixture is then cooled and 160 parts of acetone, 80 parts of water, and 710 parts of ether are added. The organic layer is separated and dried and the solvent is evaporated to leave a residual oil. This is dissolved in ethanol and the resultant hot solution is treated with charcoal and filtered. On cooling, crystals of 2-chloro-10-(2-chloroacetyl)phenothiazine separate. This product melts at about 113–115° C.

Example 5

A mixture of 10 parts of 2-chloro-10-(2-chloroacetyl)phenothiazine, 15 parts of potassium carbonate, 5 parts of sodium iodide and 120 parts of 2-butanone is heated to reflux with stirring. Then, a solution of 8 parts of N-(2-diethylaminoethyl)isonipecotamide in 25 parts of 2-butanone is added portionwise. The mixture is refluxed for 17 hours and then filtered to remove inorganic salts. The solvent is evaporated from the filtrate and the residue is dissolved in ether and washed with water. The ether solution is then extracted with dilute hydrochloric acid and the acid extract is made alkaline with concentrated ammonium hydroxide solution. The resultant alkaline mixture is extracted with ether. The ether solution is dried and the solvent is evaporated to leave a residual oil which is 2-chloro-10-{2-[4-(2-diethylaminoethylcarbamoyl)piperidino]acetyl}phenothiazine. This compound has the following formula

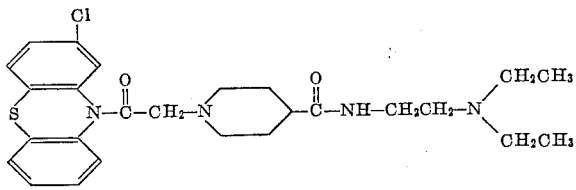

What is claimed is:
1. A compound of the formula

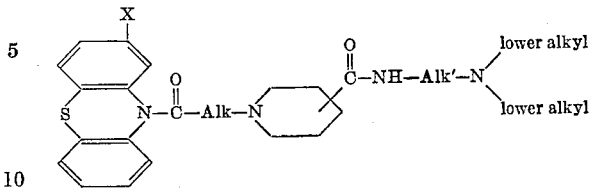

wherein X is selected from the group consisting of hydrogen and chlorine; Alk is lower alkylene; and Alk' is lower alkylene separating the nitrogens attached thereto by at least 2 carbon atoms.

2. A compound of the formula

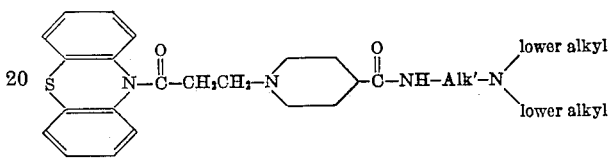

wherein Alk' is lower alkylene separating the nitrogens attached thereto by at least 2 carbon atoms.

3. 10 - {3 - [4-(2-diethylaminoethylcarbamoyl)piperidino]propionyl}phenothiazine.
4. 10 - {3 - [4-(2-dipropylaminoethylcarbamoyl)piperidino]propionyl}phenothiazine.
5. 10 - {3 - [4-(2-diethylaminoethylcarbamoyl)piperidino]butyryl}phenothiazine.
6. 2 - chloro - 10-{2-[4-(2-diethylaminoethylcarbamoyl)piperidino]acetyl}phenothiazine.

References Cited by the Examiner
UNITED STATES PATENTS 3,055,891   9/1962   Cusic et al. _____ 260—243

WALTER A. MODANCE, *Primary Examiner.*

HARRY I. MOATZ, *Assistant Examiner.*